United States Patent [19]

Van Dijk et al.

[11] Patent Number: 5,554,697
[45] Date of Patent: Sep. 10, 1996

[54] LINEAR BLOCK COPOLYMERS PROCESS FOR THEIR PREPARATION AND ADHESIVE COMPOSITION CONTAINING THEM

[75] Inventors: Menno A. Van Dijk; Jacqueline M. Veurink; Birgitte M. L. C. Van De Vliet; Jeroen Van Westrenen, all of Amsterdam, Netherlands

[73] Assignee: Shell Oil Company, Houston, Tex.

[21] Appl. No.: 583,241

[22] Filed: Jan. 5, 1996

Related U.S. Application Data

[62] Division of Ser. No. 414,842, Mar. 31, 1995, Pat. No. 5,510,423.

[30] Foreign Application Priority Data

Apr. 11, 1994 [EP] European Pat. Off. ............... 94200965

[51] Int. Cl.$^6$ ..................................... C08F 297/04
[52] U.S. Cl. ............................. 525/314; 525/316; 525/98; 524/505
[58] Field of Search ................................ 525/314, 316, 525/98; 524/505

[56] References Cited

U.S. PATENT DOCUMENTS

| | | | |
|---|---|---|---|
| 4,152,370 | 5/1979 | Moczygemba . | |
| 4,939,208 | 7/1990 | Lanza | 505/93 |
| 5,047,484 | 9/1991 | Tung . | |
| 5,071,920 | 12/1991 | Tung . | |
| 5,206,300 | 4/1993 | Chamberlain | 525/314 |
| 5,234,999 | 8/1993 | Tung . | |

OTHER PUBLICATIONS

Block Copolymeric Applied Science Publishers London, 1972, pp. 82–83.

*Primary Examiner*—Irina Zemel

[57] ABSTRACT

Block copolymers of the structure A-B-C-D of improved processability derived from a vinyl aromatic monomer and a conjugated diene, having a total bound vinyl aromatic content in the range of from 10 to 40 wt %, wherein the conjugated diene has been polymerized in a 1,2 or 3,4 addition in an amount of from 1 to 20% of the total bound conjugated diene, and wherein A represents a predominantly poly(vinylaromatic)block, B represents a predominantly poly(conjugated diene), D represents a predominantly poly-(vinylaromatic)block, and C represents a tapered block of the conjugated diene occurring in the block B and a the vinyl aromatic occuring in the block D, wherein the tapering in block C shows an increasing content of vinyl aromatic monomer in the direction to block D, wherein the weight ratio of the conjugated diene occurring in block B and the conjugated diene occurring in block C is in the range of from 5:5 to 9:1, and wherein the total apparent molecular weight of which is in the range of from 130,000 to 300,000.

7 Claims, No Drawings

LINEAR BLOCK COPOLYMERS PROCESS FOR THEIR PREPARATION AND ADHESIVE COMPOSITION CONTAINING THEM

This is a division, of application Ser. No. 08/414,842, filed Mar. 31, 1995 now U.S. Pat. No. 5,510,423.

FIELD OF THE INVENTION

The present invention relates to linear block copolymers, process for their preparation and the use of such linear block copolymers in adhesive formulations to which they impart an excellent balance of adhesive, cohesive and rheological characteristics.

BACKGROUND OF THE INVENTION

The anionic polymerization of conjugated diene and 410 vinylaromatic monomers in the presence of metal-alkyl and/or metal-aryl catalysts, resulting in so-called "living polymers" is a well-known technique and is described e.g. by M Schwarc in "Carbanions, Living Polymers and El. Transfer Processes", Interscience Publisher, J Wiley and Sons, New York, 1956.

With this living polymer technique it is possible, in particular, to prepare both linear and branched block copolymers of poly(conjugated dienes), such as polybutadiene and/or polyisoprene and poly(vinylaromatic), such as poly(styrene).

Using this technique, linear or branched block copolymers can be prepared by coupling intermediate living block copolymers or block segments with a difunctional or polyfunctional coupling agent or linear block copolymers can be prepared by fully sequential polymerization of the beforementioned monomers by using a monofunctional or difunctional alkali-metal alkyl initiator and more in particular mono- or di- lithium-alkyl or lithium-aryl initiators.

An advantage of the latter sequential polymerization methods is formed by the absence of an uncontrolled amount of diblock copolymer. Said diblock is obtained in the case of preparation of linear triblock copolymer or branched block copolymer by coupling of intermediately prepared living copolymers, due to the normally incomplete coupling reaction and subsequent termination of the obtained block copolymer mixture by means of treatment with a proton donating reagent such as alcohol, acid or water.

It is generally known in the art that such terminated intermediate uncoupled block copolymers or block segments have a negative impact on several physical properties of the finally used compositions, in which said block copolymers are incorporated, whereas on the other hand the melt viscosity of such compositions will be lowered, which is attractive for processing.

Due to the increasing requirements of modern processing techniques for the major applications of said block copolymer compositions, a strong need for high quality, standardized block copolymers arose during the last decennium.

It will be appreciated that the manufacture of fully sequential polymerized linear block copolymers and more in particular linear triblock copolymers, using a mono-functional alkalimetal initiator, has developed as the most preferred embodiment of the three before-mentioned options, as the obtained block copolymers could meet these processing technique requirements by mixing them if desired with predetermined, standardized amounts of smaller block copolymers and could provide moreover to the finally used compositions an optimal combination of physical properties.

In particular in the field of block copolymer containing adhesive compositions there is still a strong need to achieve a good balance of rheological characteristics and physical adhesive and mechanical properties of said end use compositions.

For example, the well-known three block copolymers of the type A-B-A, wherein the A-blocks represent poly(vinyl aromatic) and the B-block represents poly(conjugated diene) and more in particular poly(isoprene) normally show satisfactory adhesive properties and mechanical properties but poor thermal resistance. In addition their rather high viscosity in the molten compositions which are preferably used for end use processing processes due to environmental aspects, creates problems in the processing and transformation thereof.

Therefore it was a primary object of the present invention to provide block copolymers, which should meet the modern processing requirements of end use processing and which should show an excellent balance of rheological characteristics and physical adhesive and mechanical properties of said end use compositions. Another related object of the present invention was to provide a process for the economically attractive manufacture of said block copolymers.

SUMMARY OF THE INVENTION

As a result of extensive research and experimentation, it has surprisingly been found that the primary object of the research could be achieved with block copolymers of the structure A-B-C-D, derived from a vinyl aromatic monomer, and in particular predominantly styrene, and a conjugated diene monomer, and in particular predominantly isoprene (2-methyl-1,3butadiene), having a total bound vinyl aromatic content in the range of from 10 to 40 wt %, wherein the conjugated diene has been polymerized in a 1,2 or 3,4 addition in an amount of from 1 to 20% of the total bound conjugated diene.

DETAILED DESCRIPTION OF THE INVENTION

Block copolymers of the structure A-B-C-D meet the modern processing requirements of end use processing and show an excellent balance of rheological characteristics and physical adhesive and mechanical properties of said end use compositions. The block copolymers are derived from a vinyl aromatic monomer, and in particular predominantly styrene, and a conjugated diene monomer, and in particular predominantly isoprene (2-methyl-1,3butadiene), having a total bound vinyl aromatic content in the range of from 10 to 40 wt %, wherein the conjugated diene has been polymerized in a 1,2 or 3,4 addition in an amount of from 1 to 20% of the total bound conjugated diene, and wherein A represents a predominantly poly(vinyl aromatic) block, B represents a predominantly poly(conjugated diene) and preferably poly(isoprene), C represents a tapered block of the conjugated diene occurring in the block B and a vinyl aromatic monomer constituting the block D, which represents a predominantly poly(vinyl aromatic) block, wherein the tapering in block C shows an increasing content of vinyl aromatic monomer in the direction to block D, wherein the weight ratio of the conjugated diene occurring in block B and the conjugated diene occurring in block C is in the range of from 5:5 to 9:1 and preferably from 6:4 to 8:2, and the total apparent molecular weight of which is in the range of from 130,000 to 300,000.

With the terms "predominantly poly(vinyl aromatic)" and "predominantly poly(conjugated diene)" as used throughout this specification, is meant that the indicated monomer may be substantially pure or mixed in a minor degree with a structurally related monomer, or with a structurally different monomer and preferably the same comonomer, which occurs in other blocks i.e. in amounts of less than 15 mol %, of the total monomers of said blocks and preferably less than 5 mol % most preferably the blocks A, B and D are containing one substantially pure monomer.

With the term true or apparent molecular weight is meant a number average molecular weight measured by means of GPC using polystyrene calibration standard mol. weight samples according to ASTM D 3536. Measurement of a sample containing only polystyrene gives a true number average molecular weight and measurement of a sample containing polymerized conjugated diene gives an apparent number average molecular weight.

Suitable examples of such monomer mixtures constituting the blocks A and D are mixtures of styrene and minor amounts of monomers selected from the group consisting of alpha-methylstyrene, p-vinyltoluene, m-vinyltoluene, o-vinyltoluene 4-ethylstyrene, 3-ethylstyrene, 2-ethylstyrene, 4-tert.butylstyrene, 2,4-dimethylstyrene, butadiene, isoprene, 2-ethyl-1,3-butadiene, 2,3-dimethyl-1,3-butadiene and 1,3-pentadiene or mixtures thereof.

Suitable examples of monomer mixtures constituting block B are mixtures of isoprene and minor amounts of monomers selected from styrene, alpha-methylstyrene, p-vinyltoluene, m-vinyltoluene, o-vinyltoluene, 4-ethylstyrene, 3-ethylstyrene, 2-ethylstyrene, 4-tert butylstyrene 2,4-dimethylstyrene, butadiene, 2-ethyl-1,3-butadiene, 2,3-dimethyl-1,3 butadiene and 1,3-pentadiene or mixtures thereof.

Preferably the constituting monomers of blocks A and D are mixtures of styrene in a major amount and structurally related monomers as specified hereinbefore in a major amount and preferably alpha-methylstyrene, while the constituting monomers of block B are mixtures of isoprene in a major amount and structurally related monomers as specified hereinbefore in a minor amount and more preferably butadiene.

According to a most preferred embodiment of this aspect of the present invention, the blocks A, B and D of the block copolymers of the structure A-B-C-D, are composed of substantially pure monomers, while the constituting monomers of the blocks A and D are both substantially pure styrene and the constituting conjugated diene monomers of both blocks B and C are substantially pure isoprene.

According to a further most preferred embodiment of this aspect of the present invention, the weight ratio of the conjugated diene, occurring in the block B and the conjugated diene occurring in the block C is in the range of from 6.3:3.7 to 7.6:2.4.

The hereinbefore specified block copolymers per se show an attractive value of the melt flow rate (MFR) of a magnitude order of in the range of from 5 to 40 g/10 min. (measured according to ASTM D 1238, 5 kg, 200° C.), while the tensile strength, elongation at break and the modulus 300% (measured according to ISO 37/2 dumbbell DIN 3A) have almost the earlier found values (deviation less than 10%). It will be appreciated that a person skilled in the art would expect that the tapering in the central block between the terminal predominantly poly(vinyl aromatic) blocks, would lead to a significant less intense phase separation between the rubbery central blocks and the poly(vinylaromatic)blocks and consequently weaker domains, which would cause a higher melt flow rate and significantly deteriorated mechanical properties. Said person skilled in the art could certainly not expect an optimum of the melt flow rate at intermediate tapering levels.

It will be appreciated that another related aspect of the present invention is formed by the process for the economically attractive manufacture of the hereinbefore specified block copolymers.

Accordingly the present invention is also relating to a sequential process, comprising:

(1) charging a monovinylaromatic monomer as specified hereinbefore and a monofunctional alkalimetal-alkyl and/or alkalimetal aryl initiator and preferably sec. butyllithium or tert.butyllithium, and allowing essentially complete polymerization to occur; thereafter (2) charging a conjugated diene monomer as specified hereinbefore and allowing the polymerization to proceed up to a degree of from 50% to 90%, preferably from 60 to 80% and more preferably from 63 to 76% of the total charge of conjugated diene, thereafter (3) charging a monovinylaromatic monomer as specified hereinbefore and preferably the same as charged in step (1), and allowing essentially complete polymerization to occur.

It has been surprisingly found that block copolymers with most attractive properties are achieved, when in particular in step (2) no polar randomizer/modifier is present; i.e. block copolymer blocks B and C, wherein 1,2 or 3,4 addition polymerization occurs in the hereinbefore specified, relatively low degree, while an optimal tapered microstructure in block C is achieved.

Block copolymers containing one or more tapered central blocks derived from vinylaromatic monomer and a conjugated diene, and terminal poly(vinylaromatic)blocks were known from e.g. U.S. Pat. No. 3,792,127, U.S. Pat. No. 4,122,134, European patent applications Nos. 0398,758; 0406,747; 0436,225; 0471,998; 0446,391; and U.S. Pat. Nos. 4,939,208 and 5,227,419. However, the specific microstructures of these known block copolymer structures differ significantly from the presently proposed ones in one or more respects, so that no teachings could be derived from these publications for the presently proposed structures.

In particular, U.S. Pat. No. 3,792,127 disclosed substantially hydrogenated block copolymers having the general configuration prior to hydrogenation

A-(C)-B-C-A wherein the blocks A comprised alkenyl arene homopolymer blocks comprising 35–65 wt % of the copolymer, block B was a homopolymer block of a conjugated diene and block C represented a random copolymer block of conjugated diene and alkenyl arene. The butadiene polymer block preferably had between 7.5% and about 40% 1,2 structure.

However, as can be derived from the Table 1 (column 5) relating to physical properties of representatives I of II of these disclosed block copolymers, wherein the actual tapered block represented a relatively small part of the total block copolymer, the mechanical properties of these representatives had been significantly deteriorated with reference to the listed comparative polymer.

U.S. Pat. No. 4,122,134 disclosed block copolymers prepared by block copolymerizing a vinyl aromatic compound and a conjugated diene and comprising three blocks of homopolymerized vinyl aromatic compound, randomly copolymerized vinyl aromatic compound and conjugated diene, and homopolymerized diene respectively. It will be appreciated that no tapered block, having a continuous change of monomer content along the segment chain, occurred, due to the use of Lewis base randomizer or controlled adapted monomer supply. Moreover, high styrene content block copolymer (from 50 to 90% wt) were meant and the random copolymer segment formed by continuous feeding of a monomer mixture of vinyl aromatic and conjugated diene in a weight ratio of 0.1 to 3.0 was specified to occupy 50% by weight or more of the total elastomeric block.

At lower proportions of said random copolymer in the elastomeric block, the block copolymer might be undesirable, because of its reduced impact resistance and elongation and its enhanced susceptibility to flexural stress clouding. Said properties are moreover totally different from the presently considered ones.

European patent application No. 0398,758 disclosed hydrogenated diene block copolymers, having a polystyrene-reduced number average molecular weight of 50,000–600,000, which is a hydrogenation product of an (A)-(B) block copolymer in which (A) means and alkenyl aromatic compound polymer block and (B) means a conjugated diene homopolymer block wherein the vinyl content is more than 60%, or an alkenyl aromatic compound-conjugated diene random copolymer block wherein the vinyl content of the conjugated diene portion 15% or more, an (A)-(B)-(C) block copolymer in which (A) and (B) are as defined earlier and wherein (C) means an alkenyl aromatic compound- conjugated diene copolymer tapered block, wherein the proportion of the alkenyl aromatic compound increases gradually, or an (A)-(B)-(A) block copolymer in which (A) and (B) are as defined earlier, in which block copolymer (1) the weight proportion of alkenyl aromatic compound/conjugated diene is 5/95 to 60/40, and (2) the content of the bound alkenyl aromatic compound in at least one block (A) is at least 3 wt % and total of the bound alkenylaromatic compound contents in the two blocks (A) or the block (A) and (C) is 3–50 wt % relative to the total weight of monomers.

European patent application No. 0406,747 disclosed polymer blends of rigid thermoplastic polymers and a tapered triblock elastomer of a monovinylidene aromatic monomer and butadiene, having a ratio of monovinylidene aromatic monomer: butadiene of 10:90 to 60:40 and having an average molecular weight (Mw) of from 50,000 to 135,000.

European patent application No. 0436,225 disclosed a method of preparing block copolymers by stepwise addition of monomers and, optionally other components to the polymerization system wherein in each step the polymerization was allowed to continue until essentially no free monomer is present, characterized by the following charges in the respective (co)polymerization steps (1) monovinylaromatic monomer, randomizer and initiator (2a) monovinylaromatic monomer and initiator (2b) a mixture of monovinylaromatic monomer and conjugated diene monomer (2c) monovinylaromatic monomer and initiator, and (3) conjugated diene monomer and finally a coupling agent is added. The copolymers were said to be particularly useful for shrink film packaging applications.

European patent application No. 0466,391 disclosed bituminous binder compositions, comprising a bituminous binder and a tapered block copolymer of the A-B-A type wherein the A block is a monovinyl aromatic compound and the B block is a conjugated diene and a tapered copolymer of the conjugated diene and the monovinyl aromatic compound, wherein up to 100 per cent of the B block may be formed of said tapered copolymer segment.

European patent application No. 0471,998 disclosed a branched block copolymer of general formula $(B_1\text{-}T\text{-}A\text{-}B_2)_nX$, wherein $B_1$ and $B_2$ are polydiene blocks, A is a polyvinylaromatic block, T was a random copolymer segment composed of units of diene and vinylaromatic monomers, X was a coupling radical having a valence equal to n and n was an integer of from 3 to 20.

Said block copolymers could be used in adhesives, to which they were alleged to impart an excellent balance of adhesive cohesive and rheological characteristics as well as resistance to thermo-oxidation, and in compositions with thermoplastic polymers resulting in products with improved shock resistance and transparency.

U.S. Pat. No. 5,227,419 disclosed a process of preparing a polymer, comprising:

(a) charging a monovinylaromatic monomer, a randomizer and an initiator, and allowing polymerization to occur until essentially no free monomer was present; thereafter (b) charging additional monovinylaromatic monomer and initiator, and allowing polymerization to occur until essentially no free monomer was present; and (c) charging a mixture of monovinylaromatic monomer and conjugated diene monomer, and allowing polymerization to occur until essentially no free monomer is present; wherein said monomer charges in (a), (b) and (c) represent the only monomer additions during the course of said process, and wherein said initiator charges in (a) and (b) represent the only initiator additions during the course of said process.

Not any of the hereinbefore discussed publications were disclosing or even suggesting the existence of an optimum melt flow rate under maintenance of the relevant mechanical properties.

It will be appreciated that a further aspect of the present invention is formed by adhesive compositions and in particular hot melt adhesive compositions or sealant—or coating compositions, comprising the hereinbefore specified block copolymers together with the auxiliaries usual for this purpose.

Accordingly a further aspect of the present invention is related to adhesive compositions, comprising one or more hereinbefore specified block copolymers, in addition to one or more members selected from tackifying resins, stabilizers which inhibit or retard heat degradation, oxidation, skin formation and colour formation, and optionally plasticizers, such as rubber extending plasticizers and/or compounding oils and/or liquid resins. Stabilizers are typically added to the commercially available compositions in order to protect the polymers against heat degradation and oxidation during the preparation, use and storage of the adhesive compositions.

The adhesive compositions can be composed and applied as hot-melt adhesives and as solvent-based adhesives, the former of which are strongly preferred.

The hot-melt adhesive composition according to the present invention normally comprises from 15 wt % to 50 wt % of the hereinbefore specified block copolymer, preferably from 30 wt % to 50 wt %, based on the weight of the hot-melt adhesive composition; from 25 wt % to 50 wt %, preferably from 30 wt % to 50 wt % of a B block compatible primary tackifying resin based on the weight of the hot-melt adhesive composition; from 0 wt % to 20 wt % and preferably from 5 to 15 wt %, of a plasticizing oil or secondary tackifying resin or both if any, based on the weight of the hot-melt adhesive composition; and from 0.1 wt % to 2 wt %, preferably from 0.5 wt % to 1.5 wt % of a stabilizer and/or antioxidant, based on the weight of the hot-melt adhesive composition.

The primary tackifying resins useful in the practice of this invention include hydrocarbon resins, synthetic polyterpenes, rosin esters and natural terpenes which are semi-solid or solid at ambient temperatures, and which soften or become liquid at temperatures ranging generally from 70° C. to 135° C. preferably from 85° C. to 120° C.

Exemplary of the primary tackifying resins are compatible resins such as (1) natural and modified rosins such as, for example, gum rosin, wood rosin, tall oil rosin, distilled rosin, hydrogenated rosin, dimerized rosin, and polymerized rosin; (2) glycerol and pentaerythritol esters of natural and modified rosins, such as, for example, the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natured terpenes, e.g. styrene/terpene and alphamethyl styrene/terpene; (4) polyterpene resins having a softening point, as determined by ASTM method E28–58T, of from 80° C. to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such as, for example, the resin product resulting from the condensation, in an acidic medium, of a bicyclic terpene and a phenol; (6) aliphatic petroleum hydrocarbon resins having a Ball and Ring softening point of from 70° C. to 135° C.; the latter resins resulting from the polymerization of monomers consisting primarily of olefins and diolefins; also included are the hydrogenated aliphatic petroleum hydrocarbon resins; (7) aromatic petroleum hydrocarbon resins, and mixed aromatic and aliphatic petroleum hydrocarbon resins, or the hydrogenated derivatives thereof; (8) aromatic modified alicyclic petroleum hydrocarbon resins and the hydrogenated derivatives thereof; and (9) alicyclic petroleum hydrocarbon resins and the hydrogenated derivatives thereof. The preferred primary tackifying resins for use in the practice of this invention are represented by those of the sub-paragraphs (1), (3) and (7), supra or mixtures thereof. Suitable secondary tackifying resins are those named species wherein the resin is a liquid at ambient temperature.

Most preferred primary tackifying resins have been found to belong to the type of resins as specified in subparagraph 7, wherein the aliphatic hydrocarbon resins represent the major part, i.e. more than 50 wt % of the total resin.

Examples of such resins are marketed by HERCULES companies under the tradename HERCULES MBG and HERCOTAC and in particular HERCULES MBG 208 and those resins marketed by EXXON under the tradename ESCOREZ 2000 series.

It will be appreciated that due to the found sharp viscosity decrease of the block copolymers of the present invention, the amounts of plasticizing oils to be used in the adhesive compositions may be smaller than usual or can even be deleted dependent on the composition of the finally desired adhesive composition.

If desired, various plasticizing oils are useful in the practice of this invention. The plasticizing oil can be used in place of or in combination with the secondary tackyfier to reduce viscosity and improve tack properties. Plasticizing oils which have been found useful include olefin oligomers and low molecular weight polymers as well as vegetable and animal oil and their derivatives. The petroleum derived oils which may be employed are relatively high boiling materials containing only a minor proportion of aromatic hydrocarbons (preferably less than 30 per cent and, more particularly, less than 15 per cent by weight of the oil).

Alternatively, the oil may be totally non-aromatic. The oligomers may be polypropylenes, polybutenes, hydrogenated polyisoprene, hydrogenated polybutadiene, polypiperylene and copolymers of piperylene and isoprene having average molecular weights between 350 and 10,000. Vegetable and animal oils include glyceryl esters of the usual fatty acids and polymerization products thereof.

The stabilizer and/or antioxidant, used in accordance with the practice of the present invention includes high molecular weight hindered phenol derivatives, high molecular weight hindered amine or triazine derivatives or phosphorous and/or sulphur-containing hindered compounds, or mixtures thereof.

It will be appreciated that the stabilizers of each of the beforementioned types may be used alone or in proper combination of two or more of them.

Preferred representatives of stabilizers and/or antioxidants are pentaerythrityl-tetrakis(3,5-di-tert-butyl-4-hydroxy-hydrocinnamate) (IRGANOX 1010); octadecyl ester of 3,5-bis (1,1-dimethylethyl)-4-hydroxy benzene propanoic acid (IRGANOX 1076); 2,4-bis (n-octylthio)-6-(4-hydroxy-3,5-di-tert-butylanilino)-1,3,5-triazine (IRGANOX 565); 2-tert-butyl-6-(3-tert-butyl-2'-hydroxy-5-methylbenzyl)-4-methylphenyl acrylate (SUMILIZER GM); tris (nonylphenyl)phosphite; tris (mixed mono- and di-phenyl)-phosphite; bis (2,4-di-tertbutylphenyl)pentaerythritol diphosphite (ULTRANOX 626); distearyl pentaerythritol diphosphite (WESTON 618); styrenated diphenylamine (NAUGARD 445); N-1,3-dimethylbutyl-N'-phenyl-paraphenylenediamine (SUMILIZER 116 PPD); tris (2,4-di-tertbutylphenyl)phosphite (IRGAFOS 168); 4,4-butylidene-bis-(3-methyl-6-tert-butylphenol) (SUMILIZER BBMS); or combinations thereof.

Most preferably are used combinations of tris(nonylphenyl)phosphite (TNPP) and IRGANOX 1076, IRGANOX 565, IRGANOX 1010 or SUMILIZER GM. (IRGANOX, SUMILIZER, ULTRANOX, NAUGARD, WESTON and IRGAFOS are trade marks.)

The hot-melt adhesive compositions according to the present invention are prepared by blending the block copolymer with the stabilizer, and/or antioxidant, primary tackifying resin, the optional secondary tackifying resin or plasticizing oil, in orders of sequence which are generally known in the art.

In commercial practice it is preferred that the primary tackifying resin, the block copolymer and the stabilizer and/or antioxidant are premixed, followed by the addition of the optional secondary tackifying resin and/or plasticizing oil, under mixing conditions to provide a sufficiently elevated temperature to form a fluid melt.

For example, the copolymer can be blended with stabilizer/antioxidant and a solid compatible primary tackifying resin at temperatures ranging from 130° C. to 200° C., preferably from 150° C. to 180° C., to form a fluid melt. The optionally secondary liquid tackifying resin, or plasticizing oil can then be added to the melt.

The invention will be illustrated by the following examples, however, without any restriction of the scope of the present invention to these specific embodiments.

Preparation of block copolymers

Block Copolymer P1 (Comparison)

A styrene-(tapered isoprene/styrene)-styrene triblock copolymer (no B block) was prepared as follows.

44g of styrene was added to 4.7 kg cyclohexane at 50° C., after which 4.07 mmol sec-butyl lithium was added. The reaction was completed after 60 minutes. Hereafter 512 g isoprene and 44 g of styrene were added simultaneously. The reaction was allowed to proceed for 150 minutes, whereafter 0.5 ml of ethanol was added to terminate the living polymer. The polymer was stabilized with Ionol (3 g dissolved in 23 g cyclohexane) and isolated by steam stripping to give white crumbs.

Block Copolymer P2

A styrene-isoprene-(tapered isoprene/styrene)-styrene triblock copolymer was prepared as follows.

44 g of styrene was added to 4.7 kg cyclohexane at 50° C., after which 4.07 mmol sec-butyl lithium was added. The reaction was completed after 60 minutes. Hereafter 512 g isoprene was added. After 52% of the isoprene was polymerized as checked by sampling, 44 g of styrene was then added within 1 minute. The reaction time of both isoprene and final portion of styrene totalled to 150 minutes. Then 0.5 ml of ethanol was added to terminate the living copolymer. The polymer was stabilized with Ionol (3 g dissolved in 23 g cyclohexane) and isolated by steam stripping to give white crumbs.

Block Copolymer P3

A styrene-isoprene-(tapered isoprene/styrene)-styrene triblock copolymer was prepared according to the method as used for copolymer P2 except that after 63% of the 512 g isoprene had been polymerized as checked by sampling, 44 g of styrene was added within 1 minute. The reaction time of both isoprene and final portion of styrene totalled to 150 minutes.

Block Copolymer P4

A styrene-isoprene-(tapered isoprene/styrene)-styrene triblock copolymer was prepared according to the method as used for copolymer P2 except that after 76% of the 512 g isoprene had been polymerized as checked by sampling, 44 g of styrene was added within 1 minute. The reaction time of both isoprene and final portion of styrene totalled to 150 minutes.

Block Copolymer P5

A styrene-isoprene-(tapered isoprene/styrene)-styrene triblock copolymer was prepared according to the method for copolymer P2 except that after 83% of the 512 g isoprene had been polymerized as checked by sampling, 44 g of styrene was added within 1 minute. The reaction time of both isoprene and final portion of styrene totalled to 150 minutes.

Block Copolymer P6

A styrene-isoprene-(tapered isoprene/styrene)-styrene triblock copolymer was prepared according to the method for copolymer P2 except that after 95% of the 512 g isoprene has been polymerized as checked by sampling, 44 g of styrene was added within 1 minute. The reaction time of both isoprene and final portion of styrene totalled to 150 minutes.

Block Copolymer P7

A styrene-isoprene-(tapered isoprene/styrene)-styrene triblock copolymer was prepared according to the method used for copolymer P2, except that after 85% of the 512 g of isoprene had been polymerized as checked by sampling, 44 g of styrene were added within 1 minute. The reaction time of both isoprene and the final portion of styrene totalled to 150 minutes.

Block Copolymer P8 (Comparison)

A styrene-isoprene-styrene triblock copolymer (no tapered block) was prepared by addition of 44 g of styrene to 4.7 kg of cyclohexane at 50° C. after which 4.07 mmol sec-butyl lithium were added. The reaction was completed after 60 minutes. Hereafter 512 isoprene were added. After 120 minutes 99.9% of the isoprene was polymerized. Hereafter 44 g of styrene were added within 1 minute. The reaction time of the final portion of styrene was 60 minutes. Then 0.5 ml of ethanol were added to terminate the living copolymer. The polymer was stabilized and isolated as described for block copolymer P2.

The prepared block copolymers $P_1$–$P_6$ and $P_8$ are characterized by the following parameters, conversion factors and physical properties.

TABLE 1

| | P1 | P2 | P3 | P4 | P5 | P6 | P8 |
|---|---|---|---|---|---|---|---|
| B block (% Total Isoprene) | 0 | 52 | 63 | 76 | 83 | 95 | 100 |
| Weight Ratio B:C | 0:10 | 5.2:4.8 | 6.3:3.7 | 7.6:2.4 | 8.3:1.7 | 9.5:0.5 | 10:0 |
| True M.Wt. (kg/mol) (A block) | 11.8 | 10.8 | 10.7 | 10.9 | 10.6 | 11.2 | 11.3 |
| Apparent M.Wt. Total (kg/mol) | 240 | 230 | 210 | 210 | 200 | 240 | 220 |
| Melt flow rate(H) | 11.9 | 21.8 | 30.7 | 19.6 | 16 | 14.1 | 6.9 |
| Tensile strength (MPa) | 12.5 | 12.4 | 12.7 | 11.6 | 12.8 | 12.1 | 12.1 |
| Modulus 300% (MPa) | 0.88 | 0.80 | 0.79 | 1.00 | 1.00 | 0.96 | 1.06 |
| Elongation at break (%) | 1220 | 1270 | 1280 | 1120 | 1130 | 1120 | 1150 |
| Hardness direct (shA) | 36 | 38 | 35 | 39 | 37 | 38 | 39 |
| Hardness 30s (shA) | 31 | 31 | 29 | 36 | 33 | 36 | 38 |

Preparation of Adhesive Compositions

Several adhesive compositions were prepared comprising 100 parts by weight of a specific block copolymer as listed in Table 2, 125 parts by weight of PICCOTAC 95 (trademark) and 25 parts by weight of CATENEX N945 (trademark).

The block copolymer for the adhesive composition, in the form of crumbs or pellets, was fed by means of a weigh feeder belt into the feed section of a co-rotating twin screw extruder having melting, mixing, and pumping elements. The tackifying resin was converted to molten form in a melt pot and pumped by means of a metering pump into one or more of the auxiliary ports in the extruder barrel. The extending oil was pumped by means of a metering pump into another of the auxiliary ports in the extruder barrel. The weigh feeder belt for the elastomer and the metering pumps for the tackifying resin and the extending oil were calibrated to provide the formulations set forth in Table I. Antioxidants were added to the block copolymer to form a preblend, prior to the introduction into the extruder. Thereafter the tackifying resin and extender oil were added to the extruder.

The antioxidants were selected from the group of alkyl substituted phenols and substituted phosphate antioxidants. The level of antioxidant ranged from 1 to 3 parts per 100 parts of copolymer.

It will be recognized by those of ordinary skill in the art that minor variations in the foregoing procedure may be necessary, depending on the characteristics of individual extruders.

The compounded extrudate was stored at room temperature and reheated at a temperature of 160° to 200° C.; it was delivered by means of a closed piping system to a positive displacement pump, which in turn delivered the molten adhesive through a coating die onto a backing material, which was transported by means of an appropriate web handling system. The backing material was biaxially oriented polypropylene (BOPP) film, having a nominal thickness of 25 micrometres (1.0 mils). The backing has been corona treated to provide a surface energy of at least 39 dynes/cm. Usually, the corona treatment provided surface energy of less than 44 dynes/cm. One corona treated surface was coated with a release layer of K-release copolymer (trademark of Hoechst) at an average thickness of 0.1 to 0.5 micrometres.

The adhesive layer was coated on the corona treated surface opposite the surface containing the release layer.

The thickness of the adhesive layer in the examples was adjusted to provide a coating weight of 20 to 25 grams of adhesive per square metre of backing. It will be recognized by those of ordinary skill in the art that the coating weight of the adhesive may vary slightly depending on the design of the equipment, the skill of the operator, and the temperature or viscosity of the adhesive.

The hot adhesive on the web was quenched by passing the coated web around cooling rolls. The coated web was wound into a continuous roll, from which it could be slit to the desired width for testing and/or ultimate use.

The values of 180 peel adhesion were determined by PSTC 1 or ASTM Test Method 3330-M83, 180 Peel Adhesion from Stainless Steel. The values reported are the average of two or more determinations and are reported in Newtons of peel per 25 mm width of coated pressure sensitive tape at a crosshead or carriage rate of 300 mm per minute.

The values of shear strength were determined by FTM 8 or by ASTM Test Method 3654-82, 23° C. Shear to Stainless Steel. The values are reported in minutes until failure and are the average of two or more determinations. Typically, if the sample did not fail in approximately one day, i.e. more than 10000 minutes, the test was terminated, and the value is reported as the time to test termination.

TABLE 2

| | Adhesives properties and melt flow rate | | | | | | |
|---|---|---|---|---|---|---|---|
| | P1 | P2 | P3 | P4 | P5 | P6 | P7 |
| B Block (% Total Isoprene) | 0 | 52 | 63 | 76 | 83 | 95 | 85 |

TABLE 2-continued

| | Adhesives properties and melt flow rate | | | | | | |
|---|---|---|---|---|---|---|---|
| | P1 | P2 | P3 | P4 | P5 | P6 | P7 |
| MFR g/10 min (200° C./5 kg) | 12 | 22 | 31 | 20 | 16 | 14 | 22 |
| RBT (cm) | 5 | 1 | 5 | 10 | 3 | 5 | 4 |
| PPT (N) | 8 | 9 | 8 | 9 | 9 | 9 | — |
| HP (2 kgh) | 73 | 15 | 24 | >120 | 93 | 85 | >100 |
| LT (N/25 mm) | 15 | 17 | 16 | 16 | 16 | 18 | 26 |
| SAFT (°C.) | 105 | 94 | 95 | 101 | 104 | 103 | n.m. |
| PA (N/25 mm) | 13 | 12 | 13 | 12 | 12 | 13 | 23 |
| HMV (Pa · s) | 199 | n.m | 43 | 68 | 66 | 103 | 76 |

In said adhesive compositions, polymer P8 is a styrene-isoprene-styrene linear block copolymer of the prior art, used under trade name CARIFLEX TR KX209 for preparing pressure sensitive adhesive compositions, while $P_1$–$P_7$ are linear styrene-isoprene-styrene block copolymers obtained by fully sequential three step polymerization wherein the final charge of styrene is added after polymerization of varying amounts of the isoprene charge in the second polymerization step. An isoprene conversion of 100% corresponds to a pure ABD triblock copolymer, whereas an isoprene conversion of 0% means that after the formation of the first styrene block the isoprene and styrene monomers are added simultaneously.

The adhesive properties are listed in Table 2 together with the hot melt viscosities and melt flow rates of the pure polymers.

It will be appreciated from this Table 2 that these hot melt viscosities and melt flow rates vary with the relative amount of conjugated diene in the B block and C block and show a maximum in the claimed invention without a significant decrease in tack and adhesion properties.

We claim:

1. Adhesive compositions comprising:

block copolymers of the structure A-B-C-D derived from a vinyl aromatic monomer and a conjugated diene, having a total bound vinyl aromatic content in the range of from 10 to 40 wt %, wherein the conjugated diene has been polymerized in a 1,2 or 3,4 addition in an amount of from 1 to 20% of the total bound conjugated diene, and wherein A represents a predominantly poly(vinyl aromatic) block, B represents a predominantly poly(conjugated diene), D represents a predominantly poly(vinyl aromatic) block, and C represents a tapered block of the conjugated diene occurring in the block B and the vinyl aromatic constituting the block D, wherein the tapering in block C shows an increasing content of vinyl aromatic monomer in the direction to block D, wherein the weight ratio of the conjugated diene occurring in block B and the conjugated diene occurring in block C is in the range of from 5:5 to 9:1, and wherein the total apparent molecular weight is from 130,000 to 300,000; and one or more components selected from tackifying resins, stabilizers, and plasticizers.

2. The adhesive compositions according to claim 1, comprising:

from 15 wt % to 50 wt % of the block copolymer, based on the weight of the adhesive composition;

from 25 wt % to 50 wt % of a B block compatible primary tackifying resin based on the weight of the adhesive composition;

from 0 to 20 wt % of a plasticizing oil or secondary tackifying resin, based on the weight of the adhesive composition; and from 0.1 wt % to 2 wt % of a stabilizer or an antioxidant, based on the weight of the adhesive composition.

3. The adhesive compositions according to claim 2, comprising from 30 wt % to 50 wt % of the block copolymer, from 30 wt % to 50 wt % of the B block compatible primary tackifying resin, and from 0.5 wt % to 1.5 wt % of the stabilizer or antioxidant.

4. The adhesive compositions according to claim 16, comprising from 5 to 15 wt % of the plasticizing oil or secondary tackifying resin.

5. The adhesive compositions according to claim 2, wherein the primary tackifying resins are hydrocarbon resins, polyterpenes, rosin esters and natural terpenes which are semi-solid or solid at ambient temperatures and which soften or become liquid at temperatures ranging generally from 70° C. to 135° C.

6. The adhesive compositions according to claim 5, wherein as the primary tackifying resins are used natural and modified rosins; copolymers and terpolymers of natured terpenes; aromatic petroleum hydrocarbon resins, and mixed aromatic and aliphatic petroleum hydrocarbon resins, or the hydrogenated derivates thereof.

7. The adhesive compositions according to claim 6, wherein as primary tackifying resins are used the aromatic petroleum hydrocarbon resins and mixed aromatic and aliphatic petroleum hydrocarbon resins, or the hydrogenated derivatives thereof, wherein the aliphatic hydrocarbon resins represent more than 50 wt % of the total resin.

* * * * *